United States Patent [19]

Bartnick et al.

[11] Patent Number: 4,473,489

[45] Date of Patent: Sep. 25, 1984

[54] AQUEOUS FLOWABLE SURFACTANT CONCENTRATES AND PROCESS THEREFOR

[75] Inventors: Bernhard Bartnick, Monheim; Werner Erwied, Langenfeld; Rainer Höfer, Düsseldorf, all of Fed. Rep. of Germany

[73] Assignee: Henkel Kommanditgesellschaft auf Aktien, Duesseldorf, Fed. Rep. of Germany

[21] Appl. No.: 481,693

[22] Filed: Apr. 4, 1983

[30] Foreign Application Priority Data

Jul. 24, 1982 [DE] Fed. Rep. of Germany ....... 3227782

[51] Int. Cl.$^3$ .............................................. B01F 17/10
[52] U.S. Cl. ................................. 252/354; 526/911; 252/557; 252/DIG. 14
[58] Field of Search ................. 252/354, 557; 526/911

[56] References Cited

U.S. PATENT DOCUMENTS

| | | | |
|---|---|---|---|
| 3,246,023 | 4/1966 | Shen et al. | 252/354 |
| 3,329,640 | 7/1967 | Scotti | 252/354 |
| 3,947,400 | 3/1976 | Burkhard et al. | 252/354 |
| 4,029,624 | 6/1977 | Burkhard et al. | 252/354 |
| 4,117,237 | 9/1978 | Longley et al. | 252/557 |
| 4,250,050 | 2/1981 | Asheck et al. | 252/354 |
| 4,310,683 | 1/1982 | Longley et al. | 252/354 |

FOREIGN PATENT DOCUMENTS 1108410  4/1968  United Kingdom ................ 252/354

Primary Examiner—Richard D. Lovering
Assistant Examiner—Anne Brookes
Attorney, Agent, or Firm—Ernest G. Szoke; Henry E. Millson, Jr.; Mark A. Greenfield

[57] ABSTRACT

The flow behavior of aqueous surfactant concentrates containing at least 20 wt. % of water-soluble salts of alkylpolyglycolether sulfosuccinates and/or alkylarylpolyglycolether sulfosuccinates is improved by adding to these concentrates at least one of the following viscosity regulators: a lower polyalkyleneether glycol having a molecular weight of at least about 1500; a water-soluble salt of a monosulfosuccinate of a lower polyalkyleneether glycol having a molecular weight of at least about 600; and a water-soluble salt of a disulfosuccinate of a lower polyalkyleneether glycol having a molecular weight of at least about 600.

19 Claims, No Drawings

AQUEOUS FLOWABLE SURFACTANT CONCENTRATES AND PROCESS THEREFOR

BACKGROUND OF THE INVENTION

Alkylpolyglycolether sulfosuccinates and alkylarylpolyglycolether sulfosuccinates are anionic surfactants that play an important part as emulsifiers in the industrial production of polymer dispersions. Concentrated aqueous solutions of such anionic surfactants show a peculiarity in rheological behavior which entails serious practical problems. Aqueous surfactant solutions of high concentration, for example, those with an active substance content of 50 wt. % or more, have the consistency of a thick gel or a paste of low fluidity and are not pumpable. If attempts are made to dilute such gels with water, the viscosity does not decrease, as would be expected, but instead initially rises to unexpectedly high values.

Because of this rheological peculiarity, emulsifiers of the type mentioned are mostly commercially available in the form of dilute aqueous solutions. Solutions of high concentration can only be produced by the addition of up to 20 wt. % lower alcohols, such as ethanol or isopropanol. However, the presence of organic solvents, for example the alcohols mentioned, in polymer dispersions is not always desirable for end uses thereof. In addition, because they are readily flammable, they involve a considerable safety risk during the manufacture of the emulsifiers as well as during transport, storage and use. Also, even slight shifts in the water/alcohol ratio in such concentrates can lead to undesirable sedimentation problems in the concentrates.

The fact that the stage of a thick gel which is no longer pumpable is frequently passed through during the dilution of aqueous surfactant concentrates which contain no alcohol causes considerable problems industrially. For example, lumps of gel, once formed, can only be redissolved with great difficulty. The valves of feed devices can thus become clogged, and changes in concentration may occur during metering. Finally, for the reasons mentioned, the dilution of such aqueous surfactant concentrates is a very time-consuming process.

DESCRIPTION OF THE INVENTION

This invention has as its goal the development of aqueous concentrates of alkylpolyglycolether sulfosuccinates and/or alkylarylpolyglycolether sulfosuccinates which can be pumped when very concentrated, and which when diluted with water will not exhibit any undesirable increase in viscosity, possibly resulting in a gel state. In particular, the present invention relates to the formulation of surfactant solutions of the described type which do not contain organic solvents, but which nonetheless can be pumped even at high concentrations, and which do not exhibit any undesirable increase in viscosity or thickening to a gel state upon dilution with water.

The present invention is based on the discovery that lower polyalkyleneether glycols and/or water-soluble salts of mono- and/or disulfosuccinates of lower polyalkyleneether glycols are effective viscosity regulators for aqueous surfactant concentrates of the above described type. It was established that the effectiveness of such viscosity regulators increases with an increase in molecular weight of the polyalkyleneether glycols or the polyalkyleneether glycols which are used for the preparation of the sulfosuccinates.

The object of this invention, therefore, is the preparation of aqueous surfactant concentrates which contain at least about 20 wt.% of water-soluble salts of the alkylpolyglycolether sulfosuccinates and/or alkylarylpolyglycolether sulfosuccinates, together with small amounts of viscosity regulators. The surfactant concentrates of the invention contain as the viscosity regulators lower polyalkyleneether glycols with a molecular weight of at least about 1500 and/or water-soluble salts of mono- and/or disulfosuccinates of lower polyalkyleneether glycols with a molecular weight of at least about 600.

An additional object of this invention is the development of a process to improve flowability of viscous aqueous surfactant concentrates containing one or more surfactants from the group of alkylpolyglycolether sulfosuccinates and alkylarylpolyglycolether sulfosuccinates by adding small amounts of viscosity regulators to the concentrates. This process is carried out with a viscosity regulator which is one or more lower polyalkyleneether glycols having a molecular weight of at least about 1500 and/or water-soluble salts of mono- and/or disulfosuccinates of lower polyalkyleneether glycols which have a molecular weight of at least about 600.

The surfactants are present in the aqueous concentrates in quantities of at least about 25 wt.%, preferably at least about 30 wt.%, and more preferably in quantities of from about 40 to about 80 wt.%, in relation to the weight of the aqueous surfactant concentrate.

The lower polyalkyleneether glycols used herein as viscosity regulators are derivatives of straight chain or branched chain glycols having from 2 to 5 carbon atoms. Of special importance are the corresponding polyethyleneether glycols and/or polypropyleneether glycols, with the last mentioned compounds, namely polyether glycols which are derivatives of 1,2-propylene glycol being particularly preferred. The above description of the lower polyalkyleneether glycols is equally applicable to the lower polyalkyleneether glycols used in the form of their monosulfosuccinate and/or disulfosuccinate water soluble salts as viscosity regulators in the practice of the invention.

When free polyalkyleneether glycols, in particular, free polyethylene glycols and polypropylene glycols, are used as the viscosity regulating components, it was found that the effectiveness of these substances becomes more pronounced as the molecular weight of the polyalkyleneether glycols increases. The free polyethyleneether glycols have a molecular weight of at least about 1500, preferably at least about 2000, for example, in the range of about 2000 to about 6000 and especially between about 3000 and about 5000.

The sulfosuccinates, especially the disulfosuccinates of lower polyalkyleneether glycols, particularly those of polyethylene glycol and/or 1,2-polypropylene glycol, have proven to be particularly effective viscosity regulators even for highly concentrated aqueous surfactant concentrates of the above type. The viscosity regulators of the invention not only decrease viscosity but also decrease gel formation, and these effects increase with increasing molecular weight and increasing degree of polycondensation of the alkylene glycols used in their formation. The molecular weight of the polyalkyleneether glycols used for the sulfosuccinates is at least about 600 as stated above, and is preferably at least about 1000. However, molecular weights up to about 6000 or above can be used. Especially preferred are sulfosuccinates or polyalkyleneether glycols of the disclosed type with molecular weights in the range of about 1500 to about 4000.

The sulfosuccinate viscosity regulators of the invention are used in the form of their water soluble salts. For practical application, alkali metal salts; soluble alkaline earth metal salts such as magnesium salts; ammonium salts; and/or salts of organic amines, such as alkylolamine salts, can be used herein. Especially important are the sodium salts. The most important salts for practical application are the sodium salts of the disulfosuccinates of polyethyleneether glycols and/or poly-1,2-propyleneether glycols, in each case with the indicated molecular weights. The description given herein regarding salt forming cations of the sulfosuccinates which are to be used as viscosity regulators is also applicable to the salt-forming cations present in the surfactants.

The viscosity regulators of the invention can be present in the aqueous surfactant concentrates in quantities up to about 20 wt. %, preferably in quantities of from about 0.1 to about 10 wt. %, and more preferably in amounts of from about 2 to about 5 wt. %. In each case these quantities are based on the aqueous surfactant concentrate. Specifically, the quantity of the viscosity regulator is determined by the desired decrease in the gel point and/or by the thickening effect of the respective surfactant. In regard to the latter aspect, the specific structure of the surfactant, especially the degree of polyalkoxylation of the basic alkylpolyglycolether and/or the alkylarylpolyglycolether, can be significant. Sulfosuccinates based on lower alkoxylated alcohols and alkyl phenols, even at high concentrations, can generally be effectively influenced by the present viscosity regulators in amounts of from about 2 to about 5 wt. %. For sulfosuccinates based on higher polyalkoxylated alcohols and alkyl phenols where the degree of polymerization for the polyalkoxy group is more than 10, for example up to 100, somewhat larger quantities of the viscosity regulator may be required.

If mixtures of lower polyalkyleneether glycols and mono- and/or disulfosuccinates of lower polyalkyleneether glycols are used as the viscosity regulators, the weight ratio of the free polyalkyleneether glycols to the sulfosuccinates generally falls in the range of from about 0.001:1 to about 3:1, preferably in the range of from about 0.001:1 to about 1:1.

The lower polyalkyleneether glycols used as viscosity regulators are known substances, most of which are commercially available. The additional mono- and/or disulfosuccinates of lower polyalkyleneether glycols that can be used as viscosity regulators herein likewise represent a known class of substances, which can be produced according to methods known from the literature. One advantageous manufacturing method for the sodium sulfosuccinates, which is particularly preferred in accordance with this invention, is given in the experimental section. The succinates obtained according to this method consist mostly of disulfosuccinates of the polyalkyleneether glycols used as starting materials. In addition, small amounts of monosulfosuccinates and unreacted polyalkyleneether glycols are present.

As a rule the polyalkyleneether glycols which are used as viscosity regulators in accordance with this invention differ from the polyalkyleneether glycols which form because of the presence of small amounts of water during the alkoxylation of alcohols or phenols. The same is true for the polyalkyleneether glycols which are used as starting materials for the production of the mono- and disulfosuccinates that can be employed as viscosity regulators herein. In accordance with this invention, the present viscosity regulators can be added depending on their type and in amount determined in advance; thus making it possible to obtain the desired effects as to viscosity and the gel state.

The viscosity regulators to be used in accordance with the invention are themselves effective surface-active substances. Thus an undesirable dilution of the surfactant concentrates with inactive components is avoided. The surfactant mixtures in accordance with the invention are also pumpable as such in highly concentrated form, and upon dilution with water no increase in the gel state takes place, but rather the desired dilution effect.

Also within the framework of the invention is the addition of the viscosity regulator to the aqueous surfactant concentrate either as a preformed compound or as a premix. Advantageously, the viscosity regulator is used as a concentrated aqueous solution, for example with an active ingredient content of from about 50 to about 90 wt. %, and mixed with the aqueous solution of the respective surfactant.

In a special embodiment of the invention the viscosity regulator is produced in situ by adding to the surfactant-forming basic components, alkylpolyglycolether and/or alkylarylpolyglycolether, the polyalkyleneether glycol forming the viscosity regulator in a planned mixing ratio, and converting the mixture obtained in a known manner, for example by reaction with maleic anhydride and addition of alkali metal sulfite, to the desired sulfosuccinate mixture with adjusted viscosity or gel point.

The alkylpolyglycolether sulfosuccinates contained as surfactants in the concentrates of the invention have the Formula I:

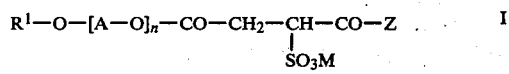

$$R^1-O-[A-O]_n-CO-CH_2-CH-CO-Z \qquad I$$
$$\mid$$
$$SO_3M$$

wherein the —SO$_3$M group can alternatively be present on the other hydrogen-containing carbon atom of the succinyl group. In Formula I, $R^1$ is a hydrocarbon group of a nonaromatic alcohol, which can be straight chain or branched, saturated or unsaturated, and which usually has 4 to 24 carbon atoms, preferably 10 to 18 carbon atoms. "A" represents a $C_2-C_5$ alkylene group, which can be straight chain or branched, and is preferably an ethylene group or a 1,2-propylene group. The subscript "n" is an integer between 1 and 100. M represents a cation of a water-soluble salt, especially an alkali metal cation, an alkaline earth metal cation, the ammonium cation, or an organic amine cation such as an alkylolamine, with the sodium cation being preferred. Z is —OM when the compound is a sulfosuccinic acid half ester, with M having the meaning given above. When the compound is a sulfosuccinic acid diester, Z is —[O—A]$_n$—O—$R^1$, wherein A, $R^1$ and n have the meaning given above.

The alkylarylpolyglycolether sulfosuccinates contained as surfactants in the surfactant concentrates of the invention have the Formula II:

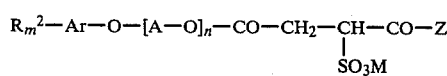

$$R^2_m-Ar-O-[A-O]_n-CO-CH_2-CH-CO-Z \qquad \text{II}$$
$$\qquad\qquad\qquad\qquad\qquad\qquad\quad |$$
$$\qquad\qquad\qquad\qquad\qquad\qquad SO_3M$$

wherein the —SO₃M group can alternatively be present on the other hydrogen-containing carbon atom of the succinyl group. In Formula II, $R^2$ can be a straight chain or branched chain, saturated or unsaturated aliphatic hydrocarbon group. Preferred are alkyl groups with 4 to 16 atoms, more preferably 6 to 14 carbon atoms, and most preferably 8 to 12 carbon atoms. The subscript m represents an integer of from 1 to 3, wherein 1 is generally preferred. Ar is a phenylene group or a naphthylene group, with the phenylene group being preferred. The symbols A, M, and n have the same meaning as is given in Formula I. Z is —OM where the compound is a sulfosuccinic acid half ester, and where the compound is a sulfosuccinic acid diester, Z is —[O—A]$_n$—O—AR—$R^2_m$, wherein M, A, Ar, $R^2$, m and n have the same meaning as given above.

The preparation of the alkylpolyglycolether sulfosuccinates and alkylarylpolyglycolether sulfosuccinates which are contained as surfactants in the concentrates of this invention have been extensively described in detail, especially in patents. In this connection see U.S. Pat. No. 3,329,640, and U.S. Pat. No. 3,947,400.

In addition to alkylpolyglycolether sulfosuccinates and/or alkylarylpolyglycolether sulfosuccinates, the aqueous surfactant concentrates of the invention can also contain other surface active agents. Suitable for example are nonionic surface active substances such as alkylphenol polyglycolethers.

Small amounts of inorganic salts such as sodium chloride and/or sodium sulfate are usually present in the aqueous concentrates of the invention from the manufacture of the alkylpolyglycolether sulfosuccinates and alkylarylpolyglycolether sulfosuccinates and the viscosity regulators to be used in accordance with the invention. Such inorganic salts are commonly present in prior art sulfosuccinate surfactants.

The invention will be better understood from the following examples which are given for illustration purposes only.

EXAMPLES

The alkylpolyglycolether sulfosuccinates, alkylarylpolyglycolether sulfosuccinates, and polyalkyleneether glycol sulfosuccinates used in EXAMPLES 1 to 6 were prepared in the manner described below. The individually obtained products will be identified hereafter by a simplified description, namely, as sulfosuccinates of the polyglycolether (EO=Moles ethylene oxide) used as the starting material.

A. Disodium-(octylphenol+11 EO)-sulfosuccinate

The starting material used was an addition product of 11 moles of ethylene oxide to 1 mole of octylphenol with the following characteristics: cloud point 12.2° C.; hydroxyl number 85.6; 100 weight percent active substance; molecular weight 655.

Into a reaction vessel equipped with stirrer and reflux condenser, dropping funnel, thermometer, and a tube for gas inlet, 225 g. (0.34 mole) of the above described ethylene oxide addition product, and 34 g (0.34 mole) of maleic acid anhydride was introduced, and the reaction vessel purged with nitrogen. The reaction mixture was heated to 98° to 100° C., and maintained at this temperature for 1 hour. Afterwards, the mixture was cooled to 75° C. After adding a solution consisting of 46 g (0.36 mole) of sodium sulfite in 695 g of water, the mixture was kept at a temperature of 75°–80° C. until the addition of sulfite was complete, after about 1½ hours.

The sulfosuccinate solution obtained had the following characteristics:

| | |
|---|---|
| Dried residue | 30.5 ± 0.5 wt. % |
| Inorganic salts | max. 1 wt. % |
| Acid number | <6 |
| Gel point | 38° C. |
| Viscosity at 25° C. | not measurable |

B. Disodium-($C_{12}$–$C_{14}$-fatty alcohol+15 EO)-sulfosuccinate

The starting material used was an addition product of 15 moles of ethylene oxide to 1 mole of $C_{12}$–$C_{14}$ fatty alcohol (0–2 wt.% $C_{10}$; 70–75 wt.% $C_{12}$; 25–30 wt.% $C_{14}$; 0–2 wt.% $C_{16}$) with the following characteristics: freezing point 31.3° C.; hydroxyl number 65.4; 100 wt.% active ingredient; average molecular weight 858.

As described under A., 195 g (0.23 mole) of ethylene oxide addition product and 23 g (0.23 mole) of maleic acid anhydride was converted into a maleic acid half ester; which when reacted with 32 g (0.25 mole) of sodium sulfite dissolved in 746 g water gave the corresponding sulfosuccinate solution with the following characteristics:

| | |
|---|---|
| Dry residue | 25 ± 0.5 wt. % |
| Inorganic salts | max. 1 wt. % |
| Acid number | <6 |
| Gel point | 41° C. |
| Viscosity at 25° C. | not measurable |

C. Disodium-(oleyl-cetyl alcohol+10 EO)-sulfosuccinate

As the starting material, an addition product was used consisting of 10 moles of ethylene oxide to 1 mode of a technical grade oleyl-cetyl alcohol (0–2 wt.% $C_{12}$; 2–7 wt.% $C_{14}$; 25–35 wt.% $C_{16}$; 55–75 wt.% $C_{18}$; 0–2 wt.% $C_{20}$; iodine number 50–55) having the following characteristics: cloud point range 26°–31° C.; hydroxyl number 80; 100 wt.% active substance; average molecular weight 701.

As described under A., 228 g (0.33 mole) of ethylene oxide addition product, and 32 g (0.33 mole) of maleic acid anhydride were reacted to form the maleic acid half ester. When reacted with 44 g (0.35 mole) of sodium sulfite dissolved in 696 g water, a sulfosuccinate solution with the following characteristics was obtained:

| | |
|---|---|
| Dry residue | 30.5 ± 0.5 wt. % |
| Inorganic salts | max. 1 wt. % |
| Acid number | <6 |
| Gel point | 57° C. |
| Viscosity at 25° C. | not measurable |

D. Disodium-(oleyl alcohol+30 EO)-sulfosuccinate

The starting material used was an addition product of 30 moles of ethylene oxide to 1 mole of a technical grade oleyl alcohol (2–8 wt.% $C_{16}$; 90–97 wt.% $C_{18}$; 0–2 wt.% $C_{20}$; iodine number 92–96). The addition product had the following characteristics: melting point 46°–49° C; hydroxyl number 25; 100 wt.% active ingredient; average molecular weight 2244.

As described under A., 273 g (0.12 mole) of ethylene oxide addition product, and 12 g (0.12 mole) of maleic acid anhydride were converted into the corresponding half ester. When reacted with 17 g (0.13 mole) of sodium sulfite dissolved in 698 g water, a sulfosuccinate solution with the following characteristics was obtained:

| Dry residue | 30.5 ± 0.5 wt. % |
|---|---|
| Inorganic salts | max. 1 wt. % |
| Acid number | <6 |
| Gel point | 52° C. |
| Viscosity at 25° C. | not measurable |

E. Tetrasodium-(polyethylene glycol 1550)-disulfosuccinate

As the starting material a commercial polyethylene glycol with a mean molecular weight of 1550 was used.

As described under A., 388 g (0.25 moles) of polyethylene glycol and 49 g (0.50 mole) of maleic acid anhydride were reacted to form the corresponding polyethylene glycol dimaleic acid half ester. When reacting with 66.5 g (0.53 mole) of sodium sulfite dissolved in 494 g of water, a sulfosuccinate solution was obtained having the following characteristics:

| Dry residue | 50.5 ± 0.5 wt. % |
|---|---|
| Inorganic salts | max. 2 wt. % |
| Acid number | <10 |

F. Tetrasodium-(polyethylene glycol 3000)-disulfosuccinate

As the starting material a commercial polyethylene glycol with an average molecular weight of 3000 was used.

As described under A., 435 g (0.145 mole) of polyethylene glycol and 28.5 g (0.29 mole) of maleic acid anhydride were reacted to form the corresponding polyethylene glycol dimaleic acid half ester. When reacted with 40 g (0.32 mole) of sodium sulfite dissolved in 496 g water, a sulfosuccinate solution with the following characteristics was obtained:

| Dry residue | 50.5 ± 0.5 wt. % |
|---|---|
| Inorganic salts | max. 2 wt. % |
| Acid number | <10 |

G. Tetrasodium-(polyethylene glycol 4000)-disulfosuccinate

As the starting material, a commerical polyethylene glycol with an average molecular weight of 4000 was used.

As described in A., 450 g (0.113 mole) of polyethylene glycol and 22.2 g (0.226 mole) of maleic acid anhydride were reacted to form the corresponding polyethylene glycol dimaleic acid half ester. When reacted with 32 g (0.25 mole) of sodium sulfite dissolved in 494 g water, a sulfosuccinate solution with the following characteristics was obtained:

| Dry residue | 50.5 ± 0.5 wt. % |
|---|---|
| Inorganic salts | max. 2 wt. % |
| Acid number | <10 |

It is possible that the products described under E, F, and G may also contain minute amounts of disodium-(polyethylene glycol)-monosulfosuccinate.

EXAMPLE 1

The aqueous solution of disodium-(octylphenol+11 EO)-sulfosuccinate from A. above having an active substance content of 31 wt.%, had a gel point of 38° C. This solution was a solid gel at room temperature. To lower the gel point, samples of this solution were mixed with various amounts of (a) polyethylene glycol with a mean molecular weight of 1550, 100 wt.% (PEG 1550), (b) polyethylene glycol with a mean molecular weight of 3000, 100 wt.% (PEG 3000), and (c) polyethylene glycol with a mean molecular weight of 4000, 100 wt.% (PEG 4000), and after thorough mixing the individual gel points were determined. The results obtained together with the gel points of the surfactant concentrate without a viscosity regulator are given in Table I below.

TABLE I

| Polyethylene glycol | Quantity added, wt. % | Gel point, °C. |
|---|---|---|
| — | — | 38 |
| PEG 1550 | 0.25 | 27 |
| " | 0.30 | 26 |
| " | 0.40 | 25 |
| " | 0.50 | 17 |
| " | 0.60 | 7 |
| " | 1.0 | <0 |
| PEG 3000 | 0.25 | 26 |
| " | 0.30 | 24 |
| " | 0.40 | 16.5 |
| " | 0.54 | 8 |
| " | 0.65 | <0 |
| " | 1.00 | <0 |
| PEG 4000 | 0.26 | 25 |
| " | 0.35 | 22 |
| " | 0.45 | 14 |
| " | 0.56 | 8 |
| " | 0.67 | <0 |
| " | 1.0 | <0 |

EXAMPLE 2

The aqueous solution of disodium-(octylphenyl+11 EO)-sulfosuccinate described in EXAMPLE 1 was mixed in order to lower the gel point with various amounts of polyethylene glycol ether sulfosuccinates, and after thorough mixing the individually obtained gel points were determined. As viscosity regulators, the substances described under E, F, and G were used, namely (d) tetrasodium-(polyethylene glycol 1550)-disulfosuccinate (PEG 1550-S-succinate), (e) tetrasodium-(polyethylene glycol 3000)-disulfosuccinate (PEG 3000-S-succinate), and (f) tetrasodium-(polyethylene glycol 4000)-disulfosuccinate (PEG 4000-S-succinate)

in the form of their 50 wt.% wolutions.

The results obtained are given in Table II. Column 2 gives the individual amounts of anhydrous active substances.

TABLE II

| Disulfosuccinate | Quantity added, wt. % | Gel point, °C. |
|---|---|---|
| — | — | 38 |
| PEG 1550-S-succinate | 0.30 | 19 |
| " | 0.40 | 14 |

TABLE II-continued

| Disulfosuccinate | Quantity added, wt. % | Gel point, °C. |
|---|---|---|
| " | 0.50 | 8 |
| " | 0.63 | <0 |
| " | 0.75 | <0 |
| " | 0.80 | <0 |
| PEG 3000-S-succinate | 0.30 | 18 |
| " | 0.40 | 12.5 |
| " | 0.50 | 6 |
| " | 0.63 | <0 |
| " | 0.75 | <0 |
| " | 1.30 | <0 |
| PEG 4000-S-succinate | 0.30 | 17 |
| " | 0.40 | 11 |
| " | 0.50 | 5 |
| " | 0.63 | <0 |
| " | 0.75 | <0 |
| " | 1.3 | <0 |

EXAMPLE 3

The aqueous solution of disodium-($C_{12}/C_{14}$-fatty alcohol+15 EO)-sulfosuccinate from B. above, with an active substance content of 25 wt.% had a gel point of 41° C. This solution was a solid gel at room temperature. In order to lower the gel point, samples of this solution were mixed with various amounts of the substances described under (a) to (c) in EXAMPLE 1. After thorough mixing, the individual gel points were determined. The results obtained, together with the gel point of the surfactant concentrate without the addition of any viscosity regulator (blank sample) are given in Table III below.

TABLE III

| Polyethylene glycol | Quantity added, wt. % | Gel point, °C. |
|---|---|---|
| — | — | 41 |
| PEG 1550 | 0.20 | 37 |
| " | 0.40 | 33 |
| " | 0.60 | 29 |
| " | 0.80 | 25 |
| " | 1.00 | 19 |
| PEG 3000 | 0.22 | 35 |
| " | 0.44 | 30 |
| " | 0.65 | 25 |
| " | 0.86 | 20 |
| " | 1.10 | 11 |
| PEG 4000 | 0.23 | 34 |
| " | 0.45 | 27 |
| " | 0.68 | 23 |
| " | 0.90 | 6 |
| " | 1.2 | 3 |

EXAMPLE 4

The aqueous solution of disodium-($C_{12}/C_{14}$-fatty alcohol+15 EO)-sulfosuccinate described in EXAMPLE 3 was mixed with various amounts of polyethylene glycol ester sulfosuccinates in order to lower the gel point. After mixing thoroughly, the individually obtained gel points were determined. As the viscosity regulators, polyethylene glycol ether disulfosuccinates described under (d) to (f) in EXAMPLE 2 in the form of 50 wt.% solutions were used.

The results of this test series are given in Table IV. Column 2 gives the individual amounts of the anhydrous active ingredients.

TABLE IV

| Disulfosuccinate | Quantity added, wt. % | Gel point, °C. |
|---|---|---|
| — | — | 41 |
| PEG 1550-S-succinate | 0.25 | 32 |
| " | 0.50 | 24 |
| " | 0.75 | 16 |
| " | 1.00 | 10 |
| " | 1.30 | 1 |
| PEG 3000-S-succinate | 0.25 | 28 |
| " | 0.50 | 20 |
| " | 0.75 | 13 |
| " | 1.00 | 7 |
| " | 1.30 | <0 |
| PEG 4000-S-succinate | 0.25 | 29 |
| " | 0.50 | 20 |
| " | 0.75 | 11 |
| " | 1.00 | 3 |
| " | 1.30 | <0 |

EXAMPLE 5

The aqueous solution of disodium-(oleyl-cetyl alcohol+10 EO)-sulfosuccinate from C. above, which has an active substance content of 30 wt.%, had a gel point of 57° C. This solution was a solid gel at room temperature. In order to lower the gel point, samples of this solution were mixed with various amounts of polyethylene glycol ether sulfosuccinates in the form of 50% aqueous solutions as described in EXAMPLE 2 under (d) to (f); and the individually obtained gel points were determined.

The results are given in Table V below. Column 2 gives the individual amounts of the anhydrous active ingredients.

TABLE V

| Disulfosuccinate | Quantity added, wt. % | Gel point, °C. |
|---|---|---|
| — | — | 57 |
| PEG 1550-S-succinate | 1.0 | 32 |
| " | 1.5 | 11 |
| " | 2.0 | 0 |
| PEG 3000-S-succinate | 1.0 | 30.5 |
| " | 1.3 | 2 |
| " | 1.5 | <0 |
| " | 2.0 | <0 |
| PEG 4000-S-succinate | 1.0 | 31 |
| " | 1.3 | 3 |
| " | 1.5 | <0 |
| " | 2.0 | <0 |

EXAMPLE 6

The aqueous solution of disodium-(oleyl alcohol+30 EO)-sulfosuccinate from D. above, having an active ingredient content of 30 wt. %, had a gel point of 52° C. This surfactant concentrate was a solid, immobile gel at room temperature. In order to lower the gel point, various amounts of the substances described in EXAMPLE 2, (d) to (f) were added in the form of 50 wt. % aqueous solutions. The individual gel points obtained are given in Table VI below. Column 2 of Table VI gives the individual amounts of the anhydrous active substances added.

TABLE VI

| Disulfosuccinate | Quantity added, wt. % | Gel point, °C. |
|---|---|---|
| — | — | 52 |
| PEG 1550-S-succinate | 2 | 32 |
| " | 2.5 | 20 |
| " | 4 | 3 |

TABLE VI-continued

| Disulfosuccinate | Quantity added, wt. % | Gel point, °C. |
|---|---|---|
| PEG 3000-S-succinate | 2 | 28.5 |
| " | 2.5 | 18 |
| " | 4 | 0 |
| PEG 4000-S-succinate | 2 | 23 |
| " | 2.5 | 14 |
| " | 4 | <0 |

EXAMPLE 7

The aqueous solution of disodium-(octylphenol+11 EO)-sulfosuccinate from A. above, with an active substance content of 31 wt. %, was mixed with various amounts of the following mixtures in order to lower the gel point:
(a) polyethylene glycol with an average molecular weight of 4000 (PEG 4000), 50% in water, and tetrasodium polyethylene glycol 4000—disulfosuccinate (PEG 4000-S-succinate), 50% in water
  Mixing ratio:
    PEG 4000:PEG-4000-S-succinate=1:1
    solids content of mixture=50±0.5%
    inorganic salts=max. 1.0%
    acid number=<5
(b) mixing of the components listed under (a)
  Mixing ratio:
    PEG 4000:PEG-4000-S-succinate=3:1
    solids content of mixture=50±0.5%
    inorganic salts=max. 0.5%
    acid number=<2.5
(c) mixing of the components listed under (a)
  Mixing ratio:
    PEG 4000:PEG-4000-S-succinate=1:3
    solids content of mixture=50±0.5%
    inorganic salts=max. 1.5%
    acid number=<7.5

After thorough mixing, the obtained gel points were determined. The results obtained together with the gel point of the surfactant concentrate without any viscosity regulator are given in Table VII below.

TABLE VII

| PEG 4000 + PEG-4000-S-succinate | Quantity added, wt. % | Gel point, °C. |
|---|---|---|
| — | — | 38 |
| Mixing ratio 1:1 according to (a) EXAMPLE 7 | 0.6 | 21 |
| | 0.8 | 15 |
| | 1.0 | 9 |
| | 1.26 | 3 |
| | 1.5 | <0 |
| Mixing ratio 3:1 according to (b) EXAMPLE 7 | 0.6 | 23 |
| | 0.8 | 19 |
| | 1.0 | 12 |
| | 1.26 | 7 |
| | 1.5 | <0 |
| Mixing ratio 1:3 according to (c) EXAMPLE 7 | 0.6 | 18 |
| | 0.8 | 13 |
| | 1.0 | 7 |
| | 1.26 | 1 |
| | 1.5 | <0 |

What is claimed is:
1. An aqueous surfactant concentrate comprising
  (a) at least about 20% by weight, based on the total weight of the aqueous surfactant concentrate, of at least one surfactant selected from the group consisting of
    (i) a water-soluble salt of an alkylpolyglycolether sulfosuccinate of formula I below:

$$R^1-O-[A-O]_n-CO-CH_2-\underset{SO_3M}{\overset{|}{CH}}-CO-Z \qquad I$$

wherein the —SO$_3$M group can alternatively be present on the other hydrogen-containing carbon atom of the succinyl group, $R^1$ is a hydrocarbon group of a nonaromatic alcohol, A is a $C_2$–$C_5$ alkylene group, n is an integer between 1 and 100, M is a cation of a water-soluble salt, and Z is either —OM or —[O—A]$_n$—O—$R^1$ wherein A, $R^1$ and n have the meaning given above; and
    (ii) a water-soluble salt of an alkylarylpolyglycolether sulfosuccinate of the formula II below:

$$R_m^2-Ar-O-[A-O]_n-CO-CH_2-\underset{SO_3M}{\overset{|}{CH}}-CO-Z \qquad II$$

wherein the —SO$_3$M group can alternatively be present on the other hydrogen-containing carbon atom of the succinyl group, $R^2$ is a straight chain or branched chain, saturated or unsaturated aliphatic hydrocarbon group, m is an integer of from 1 to 3, Ar is a phenylene group or a naphthalene group, A is a $C_2$–$C_5$ alkylene group, n is an integer between 1 and 100, M is a cation of a water-soluble salt, and Z is —OM or —[O—A]$_n$—O—Ar—$R^2_m$ wherein M, A, Ar, $R^2$, m and n have the same meaning as given above; and
  (b) from about 0.1 to about 20% by weight, based on the total weight of the aqueous surfactant concentrate of at least one viscosity regulator selected from the group consisting of
    (i) a lower polyalkyleneether glycol having a molecular weight of at least about 1500,
    (ii) a water-soluble salt of a monosulfosuccinate of a lower polyalkyleneether glycol having a molecular weight of at least about 600, and
    (iii) a water-soluble salt of a disulfosuccinate of a lower polyalkyleneether glycol having a molecular weight of at least about 600.
2. An aqueous surfactant concentrate in accordance with claim 1 wherein the polyalkyleneether glycol or sulfosuccinate derivative thereof in the viscosity regulator in (b) is a polyethyleneether glycol or a polypropylene-ether glycol.
3. An aqueous surfactant concentrate in accordance with claim 1 wherein the molecular weight of the polyalkyleneether glycol in (b) (ii) and (b) (iii) is in the range of from about 1000 to about 6000.
4. An aqueous surfactant concentrate in accordance with claim 1 wherein the water-soluble salts in (a) and (b) have as the cation an alkali metal cation, an alkaline earth metal cation, an ammonium cation, an amine cation, or a mixture of two or more of the above cations.
5. An aqueous surfactant concentrate in accordance with claim 1 wherein the quantity of component (b) is in the range of from about 0.1 to about 10% by weight.
6. An aqueous surfactant concentrate in accordance with claim 1 wherein the quantity of component (b) is in the range of from about 2 to about 5% by weight.
7. An aqueous surfactant concentrate in accordance with claim 1 wherein the surfactant in (a) is present in an amount of from about 25% to about 80% by weight.

8. An aqueous surfactant concentrate in accordance with claim 1 wherein said concentrate also contains other surface active compounds.

9. An aqueous surfactant concentrate in accordance with claim 1 wherein the lower polyalkyleneether glycol in (b) (i) has a molecular weight in the range of from about 2000 to about 6000.

10. An aqueous surfactant concentrate in accordance with claim 1 wherein the lower polyalkyleneether glycol in (b) (i) has a molecular weight in the range of from about 3000 to about 5000.

11. An aqueous surfactant concentrate in accordance with claim 1 wherein in (a) (i) the $R_1$ group contains from 4 to 24 carbon atoms.

12. An aqueous surfactant concentrate in accordance with claim 11 wherein the $R_1$ group contains from 10 to 18 carbon atoms.

13. An aqueous surfactant concentrate in accordance with claim 1 wherein A in (a) (i) is an ethylene group or a 1,2-propylene group.

14. An aqueous surfactant concentrate in accordance with claim 1 wherein in (a) (ii) the $R_2$ group is an alkyl group containing from 4 to 16 carbon atoms.

15. An aqueous surfactant concentrate in accordance with claim 14 wherein the $R_2$ group contains from 6 to 14 carbon atoms.

16. An aqueous surfactant concentrate in accordance with claim 14 wherein the $R_2$ group contains from 8 to 12 carbon atoms.

17. An aqueous surfactant concentrate in accordance with claim 1 wherein in (a) (ii) m is 1.

18. An aqueous surfactant concentrate in accordance with claim 1 wherein Ar is the phenylene group.

19. A process for improving the flowability of viscous aqueous surfactant concentrates which contain at least about 20% by weight, based on the total weight of the aqueous surfactant concentrate, of at least one surfactant selected from the group consisting of (i) a water-soluble salt of an alkylpolyglycolether sulfosuccinate of formula I below:

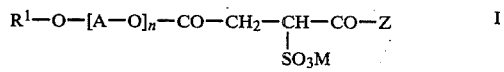

wherein the —$SO_3M$ group can alternatively be present on the other hydrogen-containing carbon atom of the succinyl group, $R_1$ is a hydrocarbon group of a nonaromatic alcohol, A is a $C_2$–$C_5$ alkylene group, n is an integer between 1 and 100, M is a cation of a water soluble salt, and Z is either —OM or —$[O-A]_n$—O—$R^1$ wherein A, $R^1$ and n have the meaning given above; and (ii) a water-soluble salt of an alkylarylpolyglycolether sulfosuccinate of the formula II below:

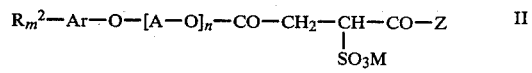

wherein the —$SO_3M$ group can alternatively be present on the other hydrogen-containing carbon atom of the succinyl group, $R^2$ is a straight chain or branched chain, saturated or unsaturated aliphatic hydrocarbon group, m is an integer of from 1 to 3, Ar is a phenylene group or a naphthalene group, A is a $C_2$–$C_5$ alkylene group, n is an integer between 1 and 100, M is a cation of a water-soluble salt, and Z is —OM or —$[O-A]_n$—O—Ar—$R^2_m$ wherein M, A, Ar, $R^2$, m and n have the same meaning as given above comprising adding thereto from about 0.1 to about 20% by weight, based on the total weight of the aqueous surfactant concentrate, of at least one viscosity regulator selected from the group consisting of A. a lower polyalkyleneether glycol having a molecular weight of at least about 1500, B. a water-soluble salt of a monosulfosuccinate of a lower polyalkyleneether glycol having a molecular weight of at least about 600, and C. a water-soluble salt of a disulfosuccinate of a lower polyalkyleneether glycol having a molecular weight of at least about 600.

* * * * *